US005309885A

United States Patent [19]
Rawlings et al.

[11] Patent Number: 5,309,885
[45] Date of Patent: May 10, 1994

[54] MARINE PROPULSION DEVICE INCLUDING A FUEL INJECTED, FOUR-CYCLE INTERNAL COMBUSTION ENGINE

[75] Inventors: David E. Rawlings, Palatine; Gene F. Baltz, Lake Villa; Mark D. Whiteside, Zion, all of Ill.

[73] Assignee: Outboard Marine Corporation, Waukegan, Ill.

[21] Appl. No.: 7,839

[22] Filed: Jan. 25, 1993

Related U.S. Application Data

[63] Continuation-in-part of Ser. No. 835,220, Feb. 13, 1992, abandoned.

[51] Int. Cl.⁵ .................... F02M 55/02; F02M 31/20; F02M 37/04
[52] U.S. Cl. ...................... 123/509; 123/516; 123/41.31; 123/52 MC; 123/456; 123/541
[58] Field of Search ........ 123/52 M, 52 MC, 52 MV, 123/456, 468, 469, 470, 472, 509, 516, 510, 540, 541, 41.31, 555, 556

[56] References Cited

U.S. PATENT DOCUMENTS

| | | | |
|---|---|---|---|
| 3,196,926 | 7/1965 | Gartland | 123/540 |
| 3,363,710 | 1/1968 | Fager | 123/509 |
| 4,054,108 | 10/1977 | Gill | 123/509 |
| 4,165,720 | 8/1979 | Barcak | 123/41.31 |
| 4,412,513 | 11/1983 | Obermayer et al. | 123/509 |
| 4,539,965 | 9/1985 | Soltau | 123/514 |
| 4,543,938 | 10/1985 | Szlaga | 123/514 |
| 4,844,043 | 7/1989 | Keller | 123/516 |
| 4,848,283 | 7/1989 | Garms et al. | 123/541 |
| 4,876,993 | 10/1989 | Slattery | 123/516 |
| 5,103,793 | 4/1992 | Riese et al. | 123/516 |

Primary Examiner—E. Rollins Cross
Assistant Examiner—Thomas N. Moulis
Attorney, Agent, or Firm—Michael, Best & Friedrich

[57] ABSTRACT

An internal combustion engine comprising an engine block including a combustion chamber, a fuel vapor separator, a fuel supply mechanism for introducing fuel to the combustion chamber, a conduit communicating between the fuel vapor separator and the fuel supply mechanism for introducing fuel, and a cooling jacket for cooling the fuel vapor separator.

57 Claims, 6 Drawing Sheets

MARINE PROPULSION DEVICE INCLUDING A FUEL INJECTED, FOUR-CYCLE INTERNAL COMBUSTION ENGINE

RELATED APPLICATIONS

This is a continuation-in-part of co-pending U.S. application Ser. No. 835,220 which was filed on Feb. 13, 1992, and is now abandoned.

BACKGROUND OF THE INVENTION

1. Technical Field

The invention relates generally to internal combustion engines and, more particularly, to 4-stroke, fuel-injected internal combustion engines.

2. Related Prior Art

It is generally known to provide a 4-stroke internal combustion engine with a fuel-injecting fuel feed system.

It is also generally known to provide a fuel feed system with a vapor separator.

SUMMARY OF THE INVENTION

The invention provides an internal combustion engine comprising an engine block including a combustion chamber, fuel injector means for supplying fuel under pressure to the combustion chamber, a wall defining a compartment housing the fuel injector means, and means for draining the compartment into the combustion chamber.

One embodiment of the invention provides an internal combustion engine comprising an engine block including a combustion chamber, a fuel vapor separator, means for introducing fuel to the engine, conduit means communicating between the fuel vapor separator and the means for introducing fuel to the engine, and means for cooling the fuel vapor separator.

One embodiment of the invention provides an internal combustion engine comprising an engine block including a combustion chamber, a fuel tank, a fuel vapor separator communicating with the tank, first means for pumping fuel from the tank to the fuel vapor separator, means for injecting fuel under pressure into the internal combustion engine, second means for pumping fuel from the fuel vapor separator to the fuel injecting means, and means for conducting fuel from the fuel injecting means to the fuel vapor separator.

One embodiment of the invention provides a fuel feed system for an internal combustion engine, the fuel feed system comprising a fuel vapor separator including a tank portion and a cover portion releasably fixed to the tank portion, means for injecting fuel to the engine, conduit means communicating between the fuel vapor separator and the means for injecting fuel, and pump means mounted on the cover portion of the fuel vapor separator for pumping fuel through the conduit means.

One embodiment of the invention provides an internal combustion engine comprising an engine block defining a combustion chamber, at least a pair of fuel injector nozzles for introducing fuel to the combustion chamber, and fuel injector manifold means for supporting the nozzles and for conducting a flow of fuel to the nozzles, the manifold means including a body having integrally formed therein a first nozzle cavity sealingly housing one of the nozzles, a second nozzle cavity sealingly housing another of the nozzles, and a fuel channel extending between the first and second cavities.

One embodiment of the invention provides an internal combustion engine comprising an engine block including a combustion chamber, an air intake manifold supported by the block, and fuel feed means for supplying fuel to the combustion chamber, said fuel feed means including a fuel pump supported internally in the air intake manifold.

One embodiment of the invention provides an internal combustion engine comprising an engine block defining a cylinder, a crankcase, air intake means communicating with the cylinder, and a water jacket between the air intake means and the crankcase.

One embodiment of the invention provides an internal combustion engine comprising an engine block including a combustion chamber, a fuel vapor separator, means for supplying fuel to the fuel vapor separator, fuel supply means for introducing fuel to the combustion chamber from the fuel vapor separator, and means for venting fuel vapor from the fuel vapor separator during engine start-up and for preventing venting of fuel vapor from the fuel vapor separator during engine operation subsequent to engine start-up.

One embodiment of the invention provides a fuel feed system for an internal combustion engine, the system comprising a fuel vapor separator adapted to contain a fuel supply, high-pressure fuel supply means for introducing fuel from the fuel vapor separator to the engine, low-pressure fuel supply means for supplying fuel from a fuel tank to the fuel vapor separator, and means responsive to conditions in the fuel vapor separator for controlling the high-pressure fuel supply means and the low-pressure fuel supply means.

One embodiment of the invention provides a fuel feed system for an internal combustion engine, the system comprising an engine block including a combustion chamber, a fuel vapor separator including a reservoir portion adapted to contain a fuel supply means for supplying fuel to the reservoir portion, fuel supply means for introducing fuel to the combustion chamber from the reservoir portion, and means for pressurizing and cooling the fuel supply in the reservoir portion.

A principal feature of the invention is the provision of a fuel-injected engine wherein the components for providing high-pressure fuel to a fuel injector are housed within the air intake manifold. By housing high-pressure fuel components within the air intake manifold, any leakage of high-pressure fuel from the fuel injecting system is contained by the air intake manifold.

A principal feature of the invention is the provision of an engine having a fuel vapor separator which is cooled by a water jacket in heat exchanging relation to the fuel contained by the fuel vapor separator. During engine operation, a flow of water through the water jacket cools the fuel vapor separator and, after engine shutdown, the water jacket continues to cool the fuel vapor separator.

Another feature of the invention is the provision of an engine including a fuel injecting system and a high-pressure fuel pump supported by the engine for providing high-pressure fuel to the fuel injecting system.

Other features and advantages of the invention will become apparent to those of ordinary skill in the art upon review of the following detailed description, claims, and drawings.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it is to be understood that the phraseology and terminology used herein is for the purpose of description and should not be regarded as limiting.

DETAILED DESCRIPTION

Figure 1:
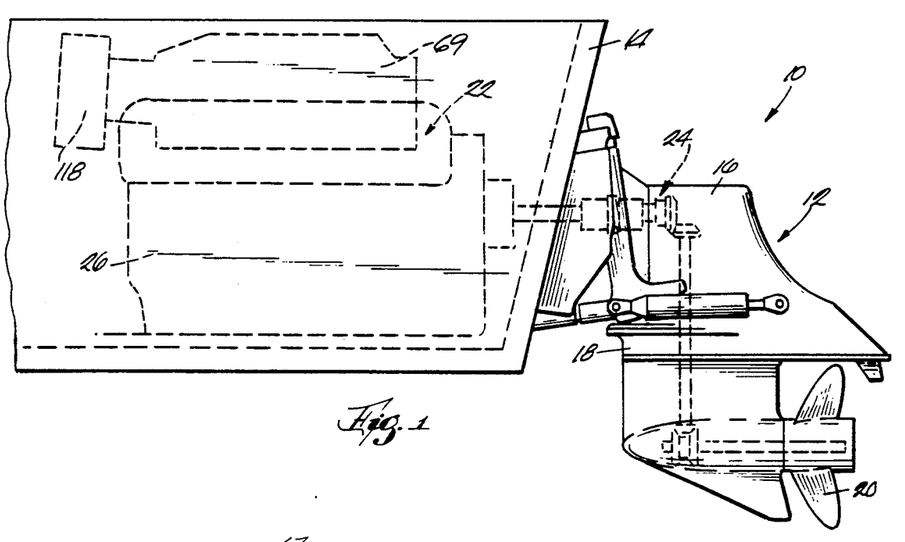
FIG. 1 is an elevation view of a boat having a stern drive including an engine embodying the invention.

FIG. 1 illustrates a marine propulsion device 10 in the form of a stern drive installation 12 located in the aft of a boat having a transom 14. The stern drive installation 12 includes a drive unit 16 which is suitably supported aft of the transom 14 and which includes a steerable and tiltable lower unit 18 carrying a propeller 20. The stern drive installation 12 also includes an internal combustion engine 22 which is suitably mounted in the boat and which is drivingly connected to the propeller 20 by a drive train 24.

Figure 2:
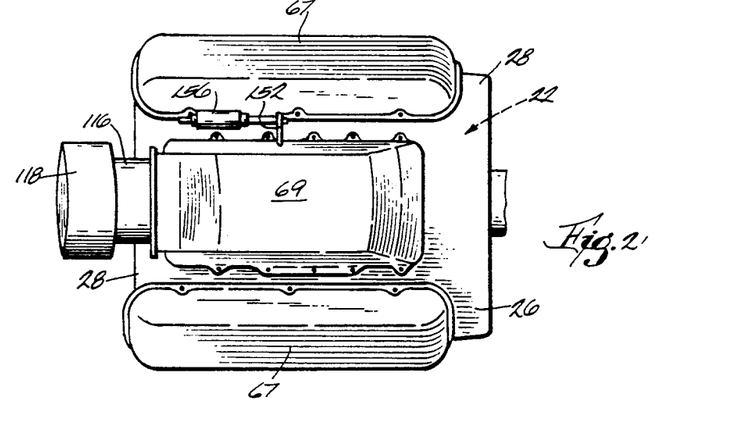
FIG. 2 is a top view of the engine shown in FIG. 1.
Figure 3:
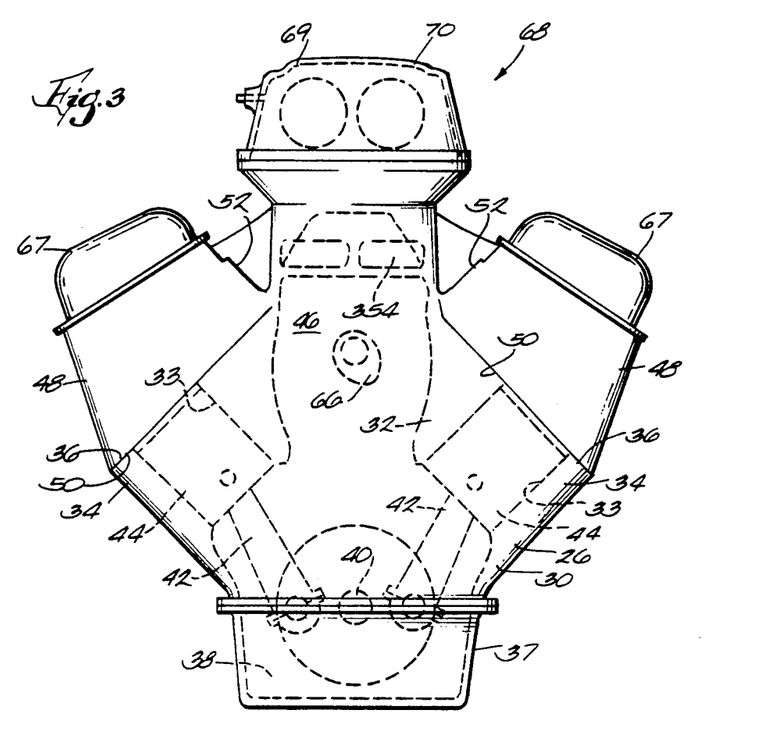
FIG. 3 is a front view of the engine shown in FIG. 1.

The engine 22 includes (FIG. 2) an engine cylinder block 26 having opposite ends 28, (FIG. 3) a lower, generally hollow case portion 30 and an upper portion 32 having extending therein a plurality of cylinders 33 communicating with the case portion 30. Although other arrangements could be used, in the illustrated embodiment, the engine 22 is an eight cylinder, four-stroke engine and the engine block 26 is a V-configuration so that the upper portion 32 includes a pair of generally outwardly and upwardly extending cylinder banks 34. The cylinder banks 34 each have outwardly facing end or head surfaces 36 and each have extending therethrough four cylinders 33 (one shown in each cylinder bank) communicating between the lower case portion 30 and the outer end surfaces 36.

A casing 37 is fixed to the case portion 30 of the engine block 26 to define therewith a crankcase 38 housing a crank shaft 40 which is rotatably supported by the engine block 26 and which is in driven connection, by means of respective piston connecting rods 42, with a plurality of pistons 44 slidably housed by respective cylinders. The engine block 26 also includes an upwardly opening cam shaft housing or valve lifter galley 46 which is defined, in part, by the cylinder banks 34 and which is located above the crankcase 38.

Figure 6:
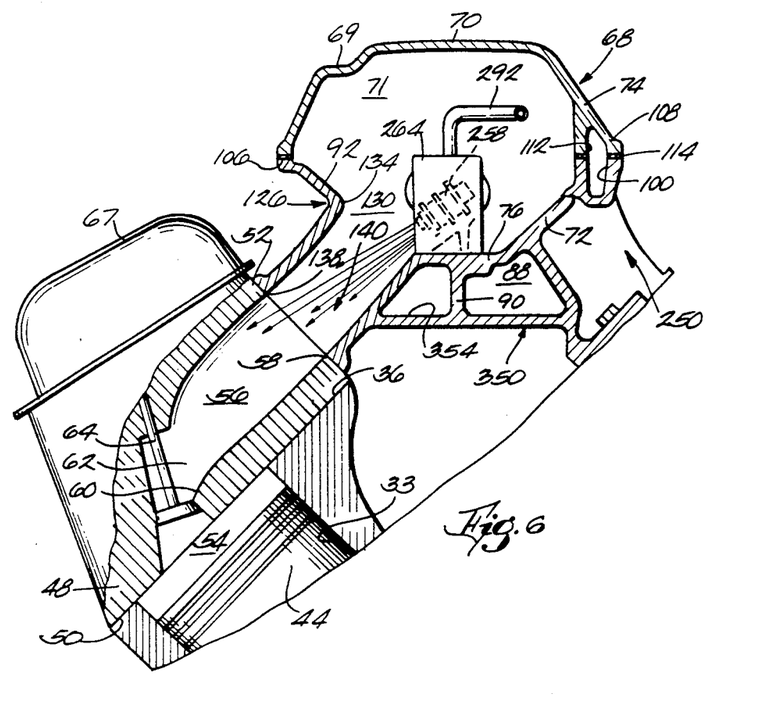
FIG. 6 is a cross-sectional view taken along line 6—6 in FIG. 4 with the manifold cover included.
Figure 7:
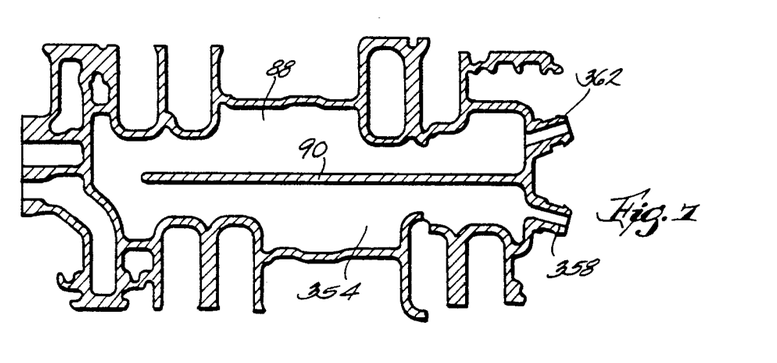
FIG. 7 is a cross-sectional view taken along line 7—7 in FIG. 5.

The engine 22 also includes a pair of cylinder heads 48 which are fastened to respective cylinder banks 34. The cylinder heads 48 have respective generally planar lower surfaces 50 overlying the outwardly facing end surfaces 36 of the respective cylinder banks 34 and have opposed facing inner surfaces 52. The cylinder heads 48, cylinders 33 and pistons 44 define therebetween (FIG. 6) respective combustion chambers 54 (one shown in FIG. 6) for a total of eight combustion chambers 54. The cylinder heads 48 also have extending therein a plurality of air intake passage portions 56 (only one of which is shown in FIG. 6) each having a first end 58 which opens through the inner surface 52 of the cylinder head 48 and a second end 60 which is communicable with a respective combustion chamber 54 through an inlet port 62 located in the lower surface 50 of the cylinder head 48.

During engine operation, the inlet ports 62 are opened and closed by respective inlet valves 64 to afford intermittent communication between respective air intake passage portions 56 in the cylinder head 48 and respective combustion chambers 54. The inlet valves 64 are opened and closed by conventional valve actuating mechanisms (not shown) which are supported by the cylinder heads 48 and which are actuated (FIG. 3), in turn, by a camshaft 66 which is housed by the camshaft galley 46 and which is rotatably supported by the engine block 26. A rocker cover 67 overlies each cylinder head 48 and houses the valve actuating mechanisms (not shown).

The engine 22 also includes means 68 for conducting a flow of air to the combustion chambers 54 for combustion. While various other constructions could be employed, in the illustrated embodiment, the air flow conducting means 68 includes (see FIGS. 1-3) an air intake manifold 69 which is fixed to the cylinder heads 48, which is generally located between the cylinder banks 34, and which includes a wall 70 defining a substantially enclosed compartment or air intake plenum 71. The air intake manifold 69 includes (FIGS. 4-6) a lower manifold portion 72 which is fixed to the engine block 26 and an upper manifold portion or cover 74 which is supported by the lower manifold portion 72. Particularly, the air intake manifold 69 includes (FIG. 5) a web 76 having spaced-apart, opposite walls 78 supporting respective outwardly facing mounting flanges 80 which are fixed by mounting bolts 82 to the inner surfaces 52 of the cylinder heads 48. When so fixed to the cylinder heads 48, the web 76 overlies and closes the otherwise upwardly opening camshaft galley 46. The web 76 (FIGS. 4, 5) also has an upper surface 84 facing the air intake plenum 71 and a lower surface 86 facing the camshaft galley 46. For reasons explained fully below, the web 76 is substantially hollow and defines therein a cavity 88 which is partitioned by a vertically extending wall or baffle 90.

The lower portion 72 of the air intake manifold 69 also includes a peripheral wall 92 which extends upwardly from the edges of the web 76. The peripheral wall 92 is preferably integrally formed with the web 76 and defines therewith the lower portion of the air intake plenum 71. Along portions of the length of the web 76 (FIG. 5), the wall 92 has a substantially vertical lower portion 94 and an outwardly splayed upper portion 96 which extends from the lower wall portion 94 and which has an upper edge 98. Also, for reasons discussed below, a portion of the peripheral wall 92 (FIG. 6) extending along an edge of the web 76 defines an upwardly opening, generally U-shaped channel 100 which extends between (FIG. 4) a first fuel vapor exhaust port 102 located adjacent to one end of the air intake plenum 71 and a second fuel vapor exhaust port 104 which is located in the upper wall portion 96, which communicates with the air intake plenum 71, and which is located approximately midway between the ends of the web 76.

In order to provide access to the interior of the air intake manifold 69, the air intake manifold cover 74 is releasably connected to the lower manifold portion 72 (FIG. 4) by suitable fasteners such as by bolts 103. The air intake manifold cover 74 has (FIGS. 5, 6) a continuous lower edge 106 which is configured to mate with the upper edge 98 of the peripheral wall 92 on the lower manifold portion 72. Also, for reasons discussed below, the lower edge 106 of the manifold cover 74 defines (FIG. 6) a downwardly opening channel 108 which overlies the U-shaped channel 100 of the lower portion 72 to form a fuel vapor exhaust passage 112 which is substantially isolated from the air intake plenum 71, and which (FIG. 4) extends along a portion of the length of the air intake manifold 69 and between the fuel vapor exhaust ports 102 and 104. Preferably, the upper and lower portions 74, 72 of the air intake manifold 69 have therebetween (FIG. 5, 6) a gasket 114 so that the respective upper and lower edges 106, 98 of the lower and upper portions 72, 74 are substantially sealed when the air intake manifold 69 is assembled.

The air flow conducting means 68 also includes (FIG. 4) an air intake assembly 116 which is supported on the end of the air intake manifold 69 adjacent the first fuel vapor exhaust port 102. The air intake assembly 116 includes an air passage 117 which communicates between the atmosphere and the air intake plenum 71, a back fire flame arrestor 118 (FIG. 2) located between the atmosphere and the air intake plenum 71, and a throttle valve assembly 122 (FIG. 4) which is located between the back fire flame arrestor 118 an the air intake plenum 71 and which can be actuated by a throttle (not shown) to open and close the air passage 117 to allow air to be drawn from the atmosphere, through the back fire flame arrestor 118 and into the manifold plenum 71. In the illustrated embodiment, the first fuel vapor exhaust port 102 is located adjacent and "downstream" of the throttle valve assembly 122. However, the first fuel vapor exhaust port 102 could also be successfully located in the air passage 117 to communicate with the air passage 117 at a point between the back fire flame arrestor 118 and the throttle valve assembly 122. Preferably, the air intake assembly 116 is constructed as a unit and is bolted to the air intake manifold 69.

Figure 4:
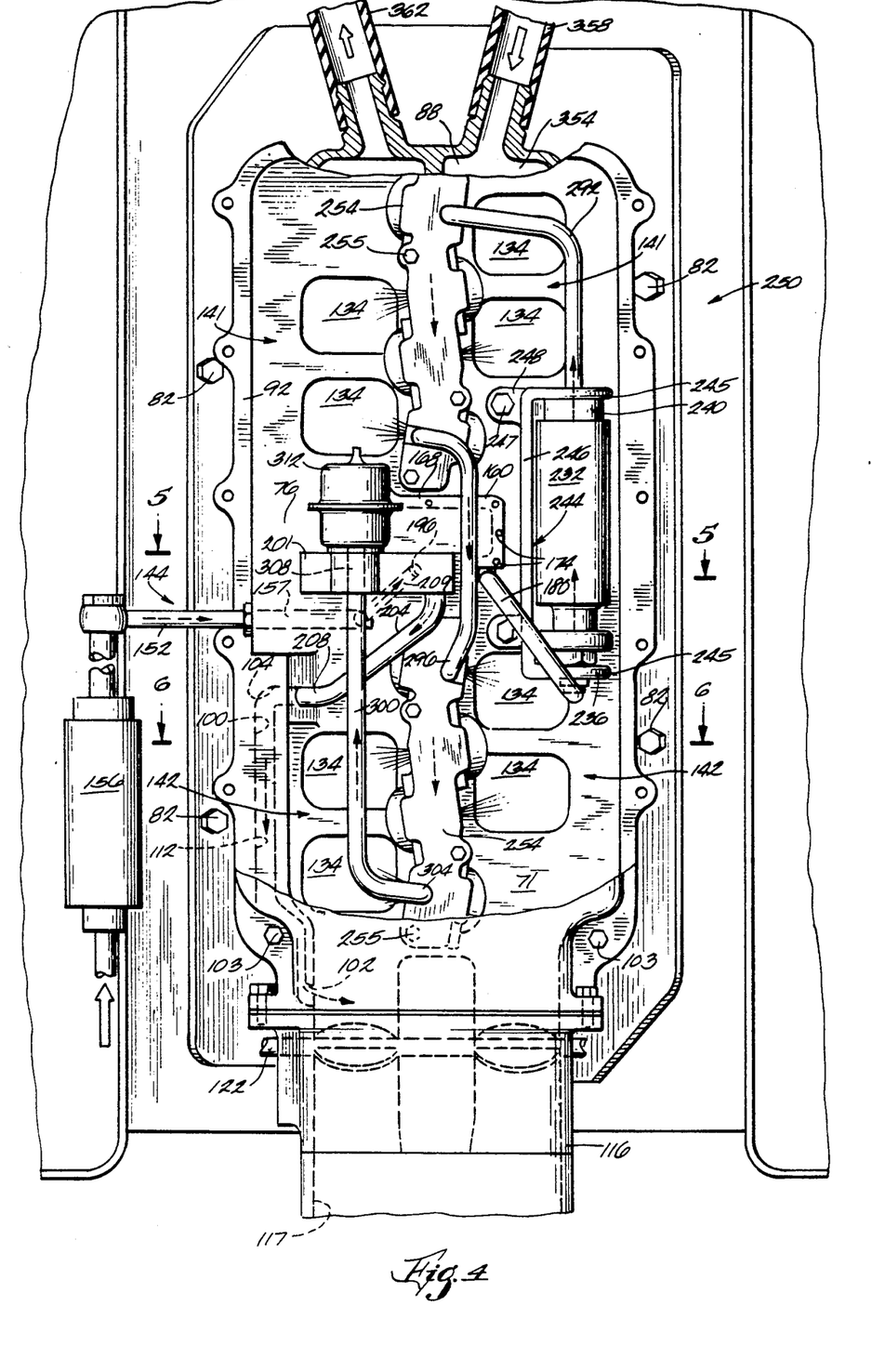
FIG. 4 is an enlarged view similar to FIG. 2 of the engine with the air intake manifold cover removed.

The air flow conducting means 68 also includes (FIG. 6) means 126 for conducting a flow of air from the air intake plenum 71 to the combustion chambers 54. While various constructions could be successfully employed, in the illustrated embodiment, the means 126 for conducting a flow of air from the air intake plenum 71 to the combustion chambers 54 includes (FIGS. 5, 6) a plurality of air intake manifold passage portions 130 (one of which is illustrated) which extend laterally from both sides of the lower air intake manifold toward the cylinder banks 34. Each air intake manifold passage portion 130 communicates with the air intake plenum 71 through (FIGS. 4, 5, 6) an air intake port 134 located in the lower portion of the peripheral wall 92 and an outlet 138 aligned with and communicating with the first end 58 of a respective air intake passage portion 56 in one of the cylinder heads 48. When the lower manifold portion is fixed to the cylinder heads 48 in the manner described above, the air intake passage portions 56 and 130 in the cylinder head and in the lower manifold portion align and communicate between the air intake plenum 71 and the inlet ports 62 in the cylinder heads 48 and define air intake passages 140 communicating between the air intake plenum 71 and the combustion chambers 54. As best shown in FIG. 4, the engine 22 includes eight air intake ports 134 corresponding to eight air intake passages 140 communicating with respective combustion chambers 54: two pairs 141 of air intake ports 134 are closely-spaced and are located adjacent one end of the air intake plenum 71, each pair serving two respective combustion chambers 54 on opposing cylinder banks 34; and two pairs 142 of air intake ports 134 are closely-spaced and are located adjacent the other end of the air intake plenum 71, each pair serving two respective combustion chambers 54 on opposing cylinder banks 34.

During engine operation, the engine 22 creates air flow from the atmosphere, through the back fire flame arrestor 118, past the throttle valves 122 in the air intake assembly 116 and into the air intake plenum 71. Air in the air intake plenum 71 is then drawn through the air intake passages 140 in the lower manifold portion 72 and the cylinder heads 48 and into the combustion chambers 54 by the opening of the respective inlet valves 64 at the appropriate timing by operation of the valve actuating mechanisms (not shown) and the camshaft 66.

The engine 22 also includes fuel feed means 144 for supplying fuel to the combustion chambers 54. While various fuel feed constructions could be employed, in the engine 22 illustrated in FIGS. 1-9, the fuel feed means 144 includes a main fuel supply tank (not shown) located remotely from the engine block 26, (FIG. 4) a low-pressure fuel line 152 communicating with the main fuel tank, and a conventional, electrically powered low-pressure fuel pump 156 communicating with the low-pressure fuel line 152 for pumping fuel from the main supply tank to the fuel line 152. As shown in FIG. 4, the low-pressure fuel pump 156 is located exteriorly of the air intake plenum 71. However, the low-pressure fuel line 152 has an end 157 extending through the peripheral wall of the lower manifold portion 72 and into the manifold plenum 71.

The fuel feed means 144 also includes (see FIG. 5) a fuel vapor separator 160 for containing a portion of the fuel supply and for removing fuel vapor from the fuel supply. In the embodiment illustrated in FIG. 5, the fuel vapor separator 160 includes a cup-shaped reservoir portion 164 which is adapted to contain a supply of fuel. In the engine 22 (FIGS. 1-9), the fuel vapor separator 160 is housed within the intake plenum 71. In that embodiment of the invention, the reservoir portion 164 of the fuel vapor separator 160 is also integrally formed with the inner surface of the lower manifold portion 72. The reservoir portion 164 is defined by a pair of spaced-apart, generally vertical walls 168 (one wall being shown in phantom in FIG. 4 and the other wall being shown in FIG. 5) extending upwardly from the upper surface 84 of the web 76 and extending laterally between the generally vertical portions 94 of the peripheral wall 92 of the lower manifold portion 72. The reservoir portion 164 includes (FIG. 5) a removable drain plug 169 which seals a drain opening extending through the peripheral wall 92 and which provides a means for draining the fuel vapor separator 160 during engine maintenance or seasonal storage.

In order to minimize obstruction of the flow of air through the air intake plenum 71 and into the respective air intake ports 134, (FIG. 4) the fuel vapor separator 160 is located centrally in the air intake plenum 71 and between the two forward pairs 142 of air intake passages 140 and the two rearward pairs 141 of air intake passages 140.

Preferably, the reservoir portion 164 is sufficiently large to contain a substantial supply of the fuel so that, during possible interruption of low-pressure fuel flow to the fuel vapor separator 160, which interruption can be caused during turning of the boat or during operation of the boat in rough water, the engine 22 can operate in the manner discussed below by using the fuel supply contained in the reservoir portion 164.

The fuel vapor separator 160 also includes (FIG. 5) a cover 172 which overlies the reservoir portion 164 and which (FIG. 4) is releasably fixed thereto by conventional fasteners 174. The fuel vapor separator cover 172 has (FIG. 5) therethrough a plurality of openings supporting respective fluid conduits which extend into the reservoir portion 164 (FIGS. 4 and 5): a high-pressure fuel outlet 176 receiving an end of a high-pressure fuel pick-up tube or take-up line 180; a fuel return inlet 184; a low-pressure fuel inlet 196; and a fuel vapor outlet 200. The fuel vapor separator cover 172 also includes (FIG. 5) a portion 201 defining a fuel vapor exhaust cavity 202 which communicates between the fuel vapor outlet 200 and an end 203 of a fuel vapor exhaust conduit 204. The fuel vapor exhaust conduit 204 has an opposite end 208 (see FIG. 4) communicating with the fuel vapor exhaust passage 112 through the second fuel vapor exhaust port 104.

The portion 201 of the fuel vapor separator cover 172 also defines (FIG. 4) therein a low pressure fuel inlet cavity 209 communicating between the end 157 of the low-pressure fuel line 152 and the low-pressure fuel inlet 196. The portion 201 of the fuel vapor separator cover 172 also defines (FIG. 5) therein a fuel return passage 210 opening into the reservoir portion 164 through the fuel return inlet 184. The portion 201 of the fuel vapor separator cover 172 also, for reasons discussed below, has extending therethrough three mounting holes 211.

The fuel vapor separator 160 includes (FIG. 5) a float valve 212 which is operable in response to the fuel level in the reservoir portion 164 to open and close the fuel vapor outlet 200 in the cover 172. The float valve 212 is normally closed so that fuel in the reservoir portion 164 cannot normally flow from the fuel vapor separator 160 into the conduit 204 and thereby into the vapor exhaust passage 112. While various suitable constructions can be used, the illustrated float valve 212 includes a needle valve member 216 which is biased into engagement with a needle valve seat 224 located in the fuel vapor outlet 200. A float 228, which is supported by the reservoir portion 164 for pivotal movement in response to changes of the fuel level in the reservoir portion 164, is operably connected to the needle valve member 216 to move the needle valve member 216 away from the needle valve seat 224 when the fuel level in the reservoir portion 164 falls below a predetermined level.

Figure 5:
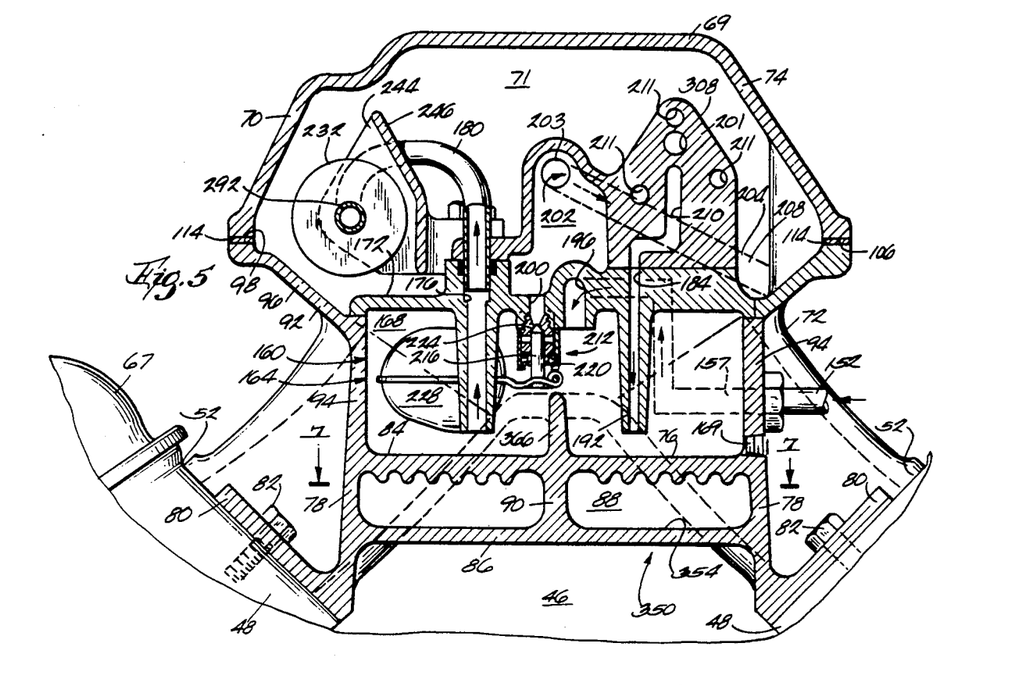
FIG. 5 is a cross-sectional view taken generally along line 5—5 in FIG. 4 with the manifold cover included.

When the fuel in the reservoir portion 164 drops below the predetermined level, the float 228 pivots downwardly and engages the valve member 216 to move the valve member 216 away from the valve seat 224 to an open position, thereby opening the fuel vapor outlet 200. Fuel vapor in the vapor separator 160 is then allowed to escape through the fuel vapor outlet 200 and the fuel vapor conduit 204 to the fuel vapor exhaust passage 112. Fuel vapor in the fuel vapor exhaust passage 112 flows through the first fuel vapor exhaust port 102, the passage 112 and the port 102 and is introduced to the flow of air entering the air intake plenum 71 at a location adjacent the air intake assembly 116.

When fuel in the reservoir portion 164 rises to a predetermined level, the float 228 rises and allows the lever arm to move the valve member 216 into engagement with the valve seat 224, thereby preventing passage of fuel vapor from the reservoir portion 164 into the fuel vapor outlet 200. Co-pending U.S. patent application Ser. No. 551,900, filed Jul. 12, 1990, describes the preferred construction for the normally closed float valve 212.

The fuel feed means 144 also includes (see FIG. 4) a high pressure fuel pump assembly 232. The high pressure fuel pump assembly 232 has a conventional construction including a high speed electric motor (not shown) which is connected to a positive displacement pump (not shown) which has an inlet 236 and an outlet 240. The high-pressure fuel take-up line 180 communicates between the reservoir portion 164 of the fuel vapor separator 160 (through the high-pressure fuel outlet 176 in the fuel vapor separator cover 172) and the high-pressure pump assembly inlet 236. Fuel from the high-pressure fuel take-up line 180 enters the inlet 236 of the fuel pump assembly 232 by means of a vacuum created by the pump, and exits the fuel pump assembly 232 at the other, outlet end 240. Preferably, the high-pressure fuel pump assembly 232 is sealed to prevent fuel leakage.

During engine operation, the high-pressure fuel pump assembly 232 preferably, and for reasons discussed below, runs at a substantially constant speed and provides a substantially constant fuel flow at a rate in excess of maximum engine requirements.

In the engine 22 (FIGS. 4-6), the high-pressure fuel pump assembly 232 is also located within the manifold plenum 71 and is supported by the engine block 26 by means of a fuel pump retaining bracket 244. The retaining bracket 244 has (see FIG. 4) opposite ends 245 which are connected to the inlet 236 and outlet ends 240 of the high-pressure fuel pump assembly 232. The bracket 244 also includes an elongated relatively wide central portion 246 which extends along substantially the entire length of the fuel pump assembly 232 and toward the manifold cover 74 and the lower manifold portion 72. The retaining bracket 244 is fixed to the upper surface of the lower air intake manifold 72 by means of bolts 247 extending through a pair of mounting flanges 248 which extend from the ends of the central portion 246. The retaining bracket 244 supports the fuel pump assembly 232 adjacent the fuel vapor separator 160 so as to minimize the length of the high-pressure fuel take-up tube 180. Also, the high pressure fuel pump assembly 232 is oriented so that the length of the high-pressure fuel pump assembly 232 extends along the side wall of the lower manifold portion 72 and does not extend into and, consequently, obstruct the path of the incoming air flow. When the high-pressure fuel pump assembly 232 is so arranged, the retaining bracket 244 also serves as a protective shield for the high-pressure fuel pump assembly 232 against the shock of possible engine backfire inside the air intake manifold 69.

The fuel feed means 144 also includes (FIGS. 4 and 6) fuel injecting means 250 for supplying fuel to the combustion chambers 54 through the air intake passages 140. While various fuel injecting means could be used, in the engine 22, the fuel injecting means 250 includes (see FIGS. 4, 6, 8 and 9) at least one fuel injector manifold 254 for supporting a plurality of fuel injector nozzles 258 and for supplying high-pressure fuel to the fuel injector nozzles 258. The illustrated engine 22 includes (FIG. 4) two fuel injector manifolds 254. The fuel injector manifolds 254 are housed by the intake plenum 71 and (FIG. 8) are fixed to the upper surface of the lower manifold portion 72 by a plurality of fasteners 259.

Preferably, each fuel injector manifold 254 includes (FIGS. 8, 9) a solid body 262 made of a relatively hard, thermally and electrically insulative material. Because the illustrated engine 22 provides eight combustion chambers 54, the bodies 262 of the fuel injector manifolds 254 each include four fuel injector nozzle cavities 266, 267, 268 and 270 respectively supporting four fuel injector nozzles 258 for a total of eight nozzles 258 corresponding to each of the eight air intake passages 140 and combustion chambers 54 provided. One end (FIG. 9) of the injector manifold body 262 has therethrough a first nozzle cavity 266 sealingly housing one of the fuel injector nozzles 258. The other, opposite end of the manifold body 262 has therethrough a second nozzle cavity 267 similarly sealingly housing another of the fuel injector nozzles 258. The manifold body 262 also has therethrough (see FIG. 8) third and fourth nozzle cavities 268 and 270 located intermediate the first and second nozzle cavities and housing third and fourth fuel injector nozzles 258. Each manifold body 262 also has (FIG. 8) extending therein a fuel channel 274 which is integrally formed in the manifold body 262 and which communicates between the four nozzle cavities 266, 267, 268 and 270. As best shown in FIG. 4, one of the fuel injector manifolds 254 serves the forward pairs 141 of air intake passages 140 and the other manifold serves the rearward pairs 142 of air intake passages 140.

Figure 8:
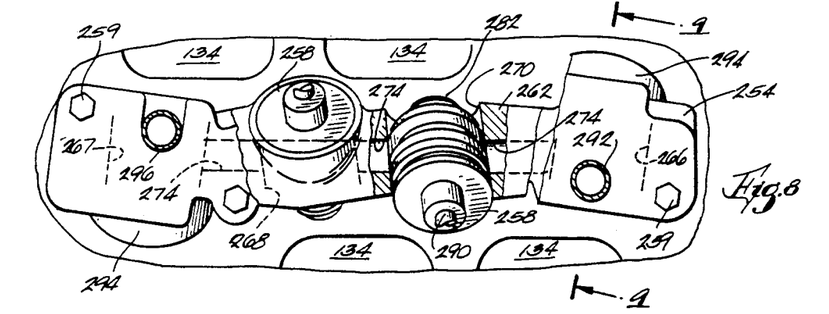
FIG. 8 is an enlarged view, partially broken away for illustration, of a fuel injector manifold.
Figure 9:
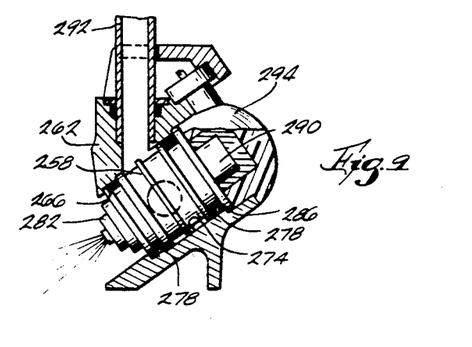
FIG. 9 is a cross-sectional view taken along line 9—9 in FIG. 8.

The fuel injector nozzles 258 are supported within respective nozzle cavities and are sealed by O-rings 278 or other suitable sealing means surrounding the nozzles 258 and engaging the portion of the body 262 defining the nozzle cavities. The fuel injector nozzles 258 have a conventional construction and are conventionally electrically actuated by an electronic fuel injection control microprocessor (not shown). As shown in FIGS. 8 and 9, each fuel injector nozzle 258 has a first, outlet end 282 which is oriented to face a respective air intake port 134 and a second end 286 supporting electrical connectors 290 which are operably connected to the fuel injection control (not shown). The fuel injecting means 250 also includes insulating caps 294 which are mounted on the electrical connectors 290 of the respective fuel injector nozzles 258 and which insulate the electrical connectors 290 from moisture and shock due to possible engine backfire in the intake plenum 71. The manifold bodies 262 support the nozzles 258 so that, when the nozzles 258 are actuated, a spray of fuel is directed into respective air intake passages 140 and onto the inlet valves 64 in the cylinder head 48.

The fuel means 250 also includes (see FIGS. 4, 8 and 9) a high-pressure fuel feed line 292 extending between the outlet of the high-pressure fuel pump assembly 232 and the first nozzle cavity 266 of one of the fuel injector manifolds 254 (the upper manifold in FIG. 4) to supply high-pressure fuel to the fuel channel 274 in the fuel injector manifold 254 and to the nozzle cavities 266, 267, 268 and 270 and fuel injector nozzles 258. The fuel injecting means 250 also includes (see FIGS. 4 and 8) a manifold connecting fuel line 296 extending between the nozzle cavity 267 of the first fuel injector manifold 254 (the lower manifold in FIG. 4) and the first nozzle cavity 266 of the second fuel injector manifold 254 to provide high pressure fuel to the second fuel injector manifold 254.

The fuel injecting means 250 also includes (FIG. 4) a high-pressure fuel return line 300 having an end 304 communicating with the fourth nozzle cavity 267 of the second fuel injector manifold 254 and an opposite end 308 which is supported by the portion 201 of the fuel vapor separator cover 172 and which communicates with the return line 192 in a manner described below for returning excess fuel from the fuel injector manifolds 254 to the fuel vapor separator 160.

During engine operation, relatively high-pressure fuel flows from the high-pressure fuel pump assembly 232 to the first fuel injector manifold 254 and into the fuel channel 274 therein so that the fuel injector nozzles 258 in the first manifold body 262 are surrounded by relatively high-pressure fuel. Similarly, relatively high-pressure fuel flows from the first fuel injector manifold 254 through the manifold connecting fuel line 296 to the second fuel injector manifold 254. When electrically actuated at the proper timing by the electronic fuel injection control (not shown), the fuel injector nozzles 258 open to release pressurized fuel from the fuel channels 274 and to direct a spray of high-pressure fuel downwardly through a respective air intake port 134 into a respective air intake passage 140. The spray of high-pressure fuel mixes with combustion air in the air intake passage 140 and is drawn into the respective combustion chamber 54 by the opening of the inlet valve 64.

Because, as mentioned above, the high-pressure fuel pump assembly 232 preferably provides a substantially constant high-pressure fuel flow at a rate in excess of maximum engine requirements, a surplus of high-pressure fuel flows through the fuel injector manifolds 254 and is returned to the fuel vapor separator 160 through the high-pressure fuel return line 300.

In order to maintain a relatively constant fuel pressure in the fuel injector manifolds 254 during engine operation at various levels of fuel demand, the fuel injecting means 250 also includes (FIGS. 4 and 5) a high-pressure fuel regulator 312 for controlling the rate of high-pressure fuel flow to the nozzles 258. The high-pressure regulator 312 is of conventional construction, and communicates between the end 308 of the high-pressure fuel return line 300 and fuel return line 192. During engine operation, the high-pressure regulator 312 controls the rate of fuel flow through the high-pressure fuel return line 300, and therefore through the fuel injector manifolds 254, as a function of the engine's fuel demand as indicated by the air pressure within the air intake plenum 71. In the engine 22, the fuel high-pressure regulator 312 is mounted on the portion 201 of the fuel vapor separator cover 172 by bolts (not shown) extending through the mounting holes 211 and, therefore, is housed within the air intake plenum 71. Because the high-pressure fuel regulator 312 is located within the air intake plenum 71, and because the high-pressure fuel regulator 312 controls the fuel flow through the high-pressure fuel return line 300 based upon the air pressure within the air intake plenum 71, the fuel injecting means 250 does not require a vacuum tube communicating between the high-pressure regulator 312 and the air intake plenum 71.

As described above, the fuel feed means 144 thus provides a low-pressure fuel feed means for pumping fuel from the remotely located fuel storage tank (not shown) and a high-pressure fuel feed loop including fuel vapor separator 160, high-pressure fuel pump 232, fuel injecting means 250 and fuel return line 300, each of which is entirely contained by the air intake plenum 71. Such an arrangement assures that any leakage of high-pressure fuel from the fuel feed means 144 will leak into the air intake plenum 71 and will either evaporate and become entrained in the flow of combustion air in the air intake plenum 71 or will drain from the air intake plenum 71 into the combustion chambers 54 through the air intake passages 140. As a result, any relatively high-pressure fuel which might leak from the fuel feed means 144 will become apparent to the operator from abnormal poor engine performance (due to excess fuel entering the combustion chambers) or stalling of the engine 22. Thus, the engine 22 also includes means for draining the air intake manifold compartment or plenum 71 into the combustion chamber 54.

The engine 22 also includes (see FIG. 5) means 350 for cooling the fuel vapor separator 160 to minimize the evaporation of the fuel contained in the reservoir portion 164. The fuel vapor separator cooling means 350 includes the location of the fuel vapor separator 160 within the air intake plenum 71 so that the flow of incoming combustion air through the air intake plenum 71 cools the fuel vapor separator 160.

The fuel vapor separator cooling means 350 also includes (FIGS. 3 and 5) a water jacket 354 located between, and in heat exchanging relation to, the camshaft galley 46 and the air intake manifold 69. The water jacket 354 includes the above-mentioned cavity 88 in the web 76 of the lower manifold portion 72. When viewed in cross-section along a horizontal plane, as in FIG. 7, the water jacket 354 is generally U-shaped and includes (FIGS. 4 and 7) a coolant inlet 358 and a coolant outlet 362 located adjacent the end of the air intake manifold 69 opposite the air intake assembly 116 and on opposite sides of the cavity dividing baffle 90. The coolant inlet 358 communicates by conventional means with a water pump (not shown) which pumps water from the body in which the boat is operating directly into the water jacket 354 so that the water entering the water jacket 354 via the coolant inlet 358 has not received heat from other areas of the engine 22. Water exiting the water jacket 354 via the coolant outlet 362 is conducted into other cooling jackets surrounding, for example the cylinders and exhaust passages (not shown) of the engine 22. The water jacket 354 is located adjacent the reservoir portion 164 of the fuel vapor separator 160 and, when the fuel vapor separator 160 is integrally formed with the lower portion 72 of the air intake manifold 69, has a wall in common with the reservoir portion 164 and has (FIG. 5) a baffle 366 extending from the upper surface 84 of the web 76 into the reservoir portion 164 to enhance the transfer of heat from the fuel contained by the reservoir portion 164 to the coolant in the water jacket 354.

Because the water jacket 354 is located between the air intake plenum 71 and the camshaft galley 46, the water jacket 354 also cools lubricating oil which can splash onto the lower surface of the web 76 from the camshaft galley 46 and the crankcase 38.

The water jacket 354 also cools the flow of combustion air conducted through the air intake plenum 71 by virtue of the heat exchanging relation of the water jacket 354 and the lower air intake manifold portion 72. This cooling effect on the combustion air increases inlet air density which increases the power of the engine 22 by enhancing combustion efficiencies. Also, the water jacket 354 acts as a heat sink for the engine 22 after engine shut down because coolant remains in the water jacket 354 after engine shut down. Water in the water jacket 354 absorbs thermal energy from the engine block 26 and other relatively hot engine components and thereby reduces fuel vapor pressures which can develop in the high-pressure fuel feed system and which can result in vapor lock debilitating the fuel feed system.

Figure 10:
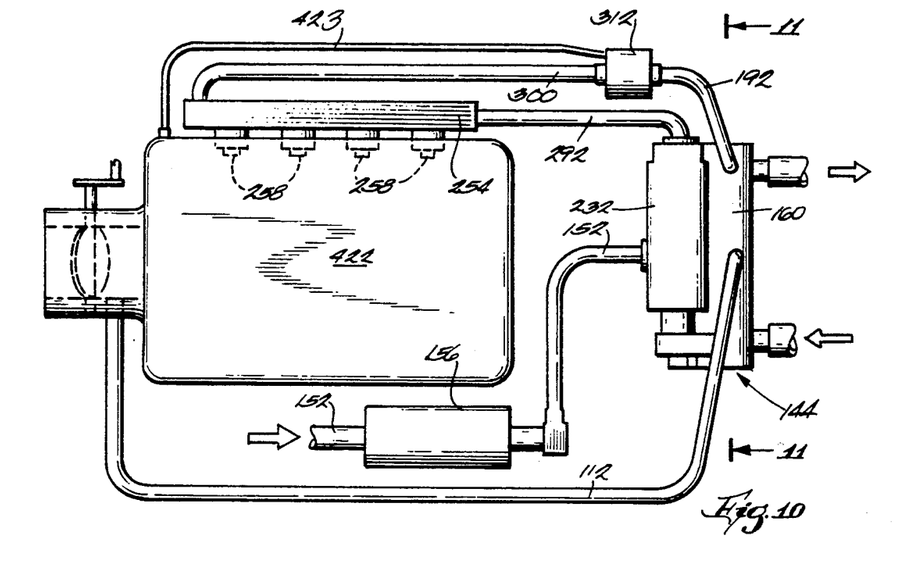
FIG. 10 illustrates an engine that is a second alternative embodiment of the invention.
Figure 11:
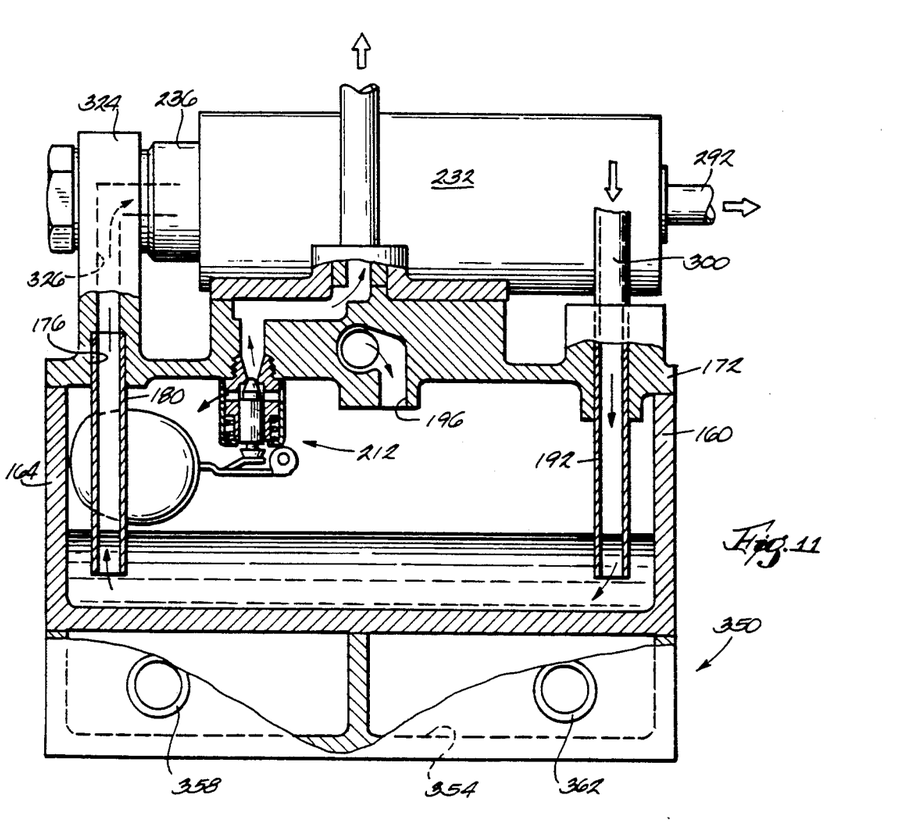
FIG. 11 is an enlarged, cross-sectional view taken along line 11—11 in FIG. 10.

An engine 422 which is a second alternative embodiment of the invention is illustrated in FIGS. 10 and 11. Many elements of the engine 422 are substantially identical to elements of the engine 22, and common elements have been given the same reference numerals. In the engine 422 the fuel feed means 144 also includes a low-pressure fuel pump 156 and a low-pressure fuel line 152 communicating with a remotely located fuel tank (not shown) for supplying the engine 22 with fuel. The fuel feed means 144 also includes a fuel vapor separator 160 having a high-pressure fuel pump assembly 232, a plurality of fuel injector nozzles 258 supported by the engine block 26 to supply fuel to the engine 22 in a conventional manner, and a fuel flow regulator 312.

Unlike the fuel feed means 144 illustrated in FIGS. 4–6, however, the high-pressure fuel pump assembly 232 of FIGS. 10 and 11 is mounted on the fuel vapor separator cover 172. The high-pressure fuel pump assembly 232 is supported by a support bracket 324 which is integrally formed with the fuel vapor separator cover 172 and which is fastened to the inlet end 236 of the high-pressure fuel pump assembly 232. The support bracket 324 has integrally formed therein a high-pressure fuel take-up cavity 326 which communicates with an end of the high-pressure fuel take-up tube 180 extending through the high-pressure fuel inlet 176 and into the reservoir portion 164 of the fuel vapor separator 160.

Like the high-pressure pump of the engine 22, the high-pressure fuel pump assembly 232 of the engine 422 supplies relatively high-pressure fuel to the fuel injectors 258 through a high-pressure fuel line 292. Excess fuel is returned to the fuel vapor separator 160 from the fuel injector nozzles 258 through a high-pressure fuel return line 300 which communicates between the fuel injector nozzles 258 and the fuel vapor separator 160 through the vapor separator cover 172. Like the engine 22, the engine 422 includes a high-pressure fuel regulator 312 communicating with the high-pressure fuel return line 300 to regulate the flow rate of fuel therethrough. Unlike the high-pressure regulator 312 of the engine 22, however, the high-pressure fuel regulator 312 of the engine 422 is not mounted on the cover 172 of the fuel vapor separator 162. Because the high-pressure fuel regulator 312 is not located within the air intake plenum 71, the high-pressure fuel regulator 312 also includes a vacuum tube 423 which communicates between the high-pressure fuel regulator 312 and the air intake plenum 71 so that the high-pressure fuel regulator 312 can control the flow rate of fuel through the high pressure return line 300, and therefore through the fuel injector nozzles 258, as a function of the air pressure within the air intake manifold 69.

The fuel vapor separator 160 illustrated in FIGS. 10 and 11 is also cooled by means of a water jacket 354 which is in heat-exchanging relation with the reservoir portion 164 of the fuel vapor separator 160. Like the water jacket 354 illustrated in FIGS. 5-7, the water jacket 354 in FIGS. 10 and 11 is located below the reservoir portion 164 of the fuel vapor separator 160, is partitioned by a dividing wall, and includes a coolant inlet 358 communicating with a source of coolant and a coolant outlet 362 communicating with other water jackets (not shown).

During engine operation fuel is drawn from the remotely located main fuel storage tank (not shown) to the engine by the low-pressure fuel pump 156 through the low-pressure fuel line 152. Relatively low-pressure fuel flows from the low-pressure fuel line 152 into the reservoir portion 164 of the fuel vapor separator 160. The high-pressure fuel take up tube 180 draws fuel from the supply of fuel in the reservoir portion 164 into the inlet 236 of the high-pressure fuel pump assembly 232 which supplies a relatively constant flow of high-pressure fuel to the high-pressure fuel line 292. The high-pressure fuel line 292 communicates with the fuel injector manifolds 254 and the fuel injector nozzles 258 which operate to spray fuel into the air passages 140 and into the combustion chambers 54. High-pressure fuel flows from the fuel injector manifolds 254 into the high-pressure fuel return line 300 and through the fuel feed regulator 312 into the vapor separator reservoir portion 164 by means of fuel return line 192.

The invention thus provides an engine having a fuel vapor separator 160 which is cooled by a water jacket in heat exchanging relation to the fuel vapor separator 160. During engine operation a flow of water through the water jacket cools the fuel vapor separator 160 and, after engine shut down, the water jacket continues to cool the fuel vapor separator 160.

Figure 12:
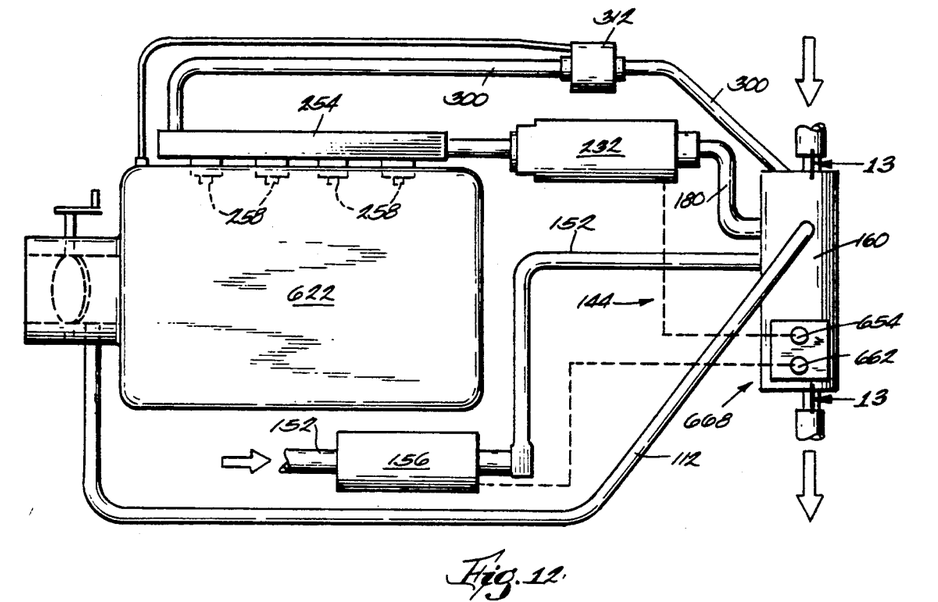
FIG. 12 illustrates an engine that is a third alternative embodiment of the invention.
Figure 13:
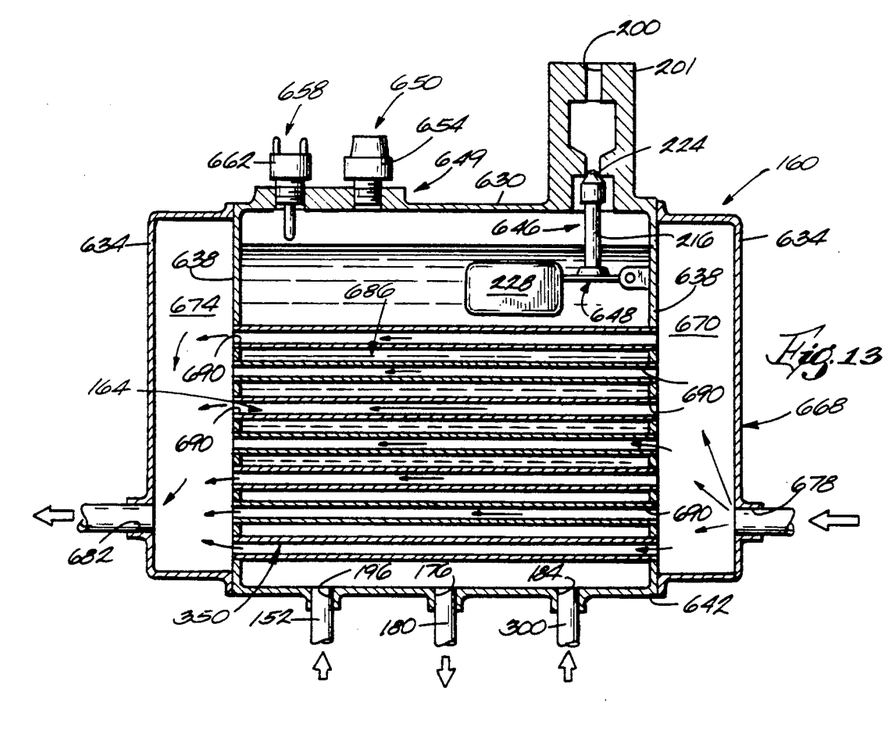
FIG. 13 is an enlarged, cross-sectional view taken along line 13—13 in FIG. 12.

An engine 622, which is a third alternative embodiment of the invention, is illustrated in FIGS. 12 and 13. Many elements of the engine 622 are substantially identical to elements of the engines 22 and 422 and common elements have been given the same reference numerals. In the engine 622 the fuel feed means 144 includes a low-pressure fuel pump 156 and a low-pressure fuel line 152 communicating with a remotely located fuel tank (not shown) for supplying the engine 622 with fuel.

The fuel feed means 144 also includes a fuel vapor separator 160, communicating with the low-pressure fuel pump 156, a high-pressure fuel pump assembly 232 communicating with the fuel vapor separator 160 via a high-pressure fuel take-up line 180, a fuel injector manifold 254, a plurality of fuel injector nozzles 258 to supply fuel to the engine 622, and a high-pressure fuel regulator 312. The high-pressure fuel regulator 312 operates in the above discussed manner to provide a return flow of fuel to the fuel vapor separator 160 at a relatively constant pressure. For example, the engine 622 can include a high-pressure fuel regulator 312 that operates to return fuel to the fuel vapor separator 160 at a relatively constant pressure of approximately 30 psi.

The low-pressure fuel pump 156 includes a conventional internal fuel flow regulator (not shown) that can be calibrated to regulate the fuel flow to the fuel vapor separator 160 at a relatively constant pressure. For example, the engine 622 can have a low-pressure fuel pump 156 that is calibrated to pump fuel to the fuel vapor separator 160 at a pressure of approximately 25 psi, which is slightly lower than the pressure of fuel returned to the fuel vapor separator 160 by the high-pressure fuel regulator 312. However, the fuel feed means 144 could also include a low-pressure regulator (not shown) separate from the low-pressure fuel pump 156 and located in the low-pressure fuel line 152 intermediate the low-pressure fuel pump 156 and the fuel vapor separator 160.

In the embodiment illustrated in FIGS. 12 and 13, the fuel vapor separator 160 includes a fuel reservoir portion 164 adapted to contain a supply of fuel. The reservoir portion 164 includes (FIG. 13) a top wall 630, a pair of outer side walls 634, a pair of inner side walls 638 and a bottom wall 642. The bottom wall 642 of the reservoir portion 164 has extending therethrough a plurality of openings supporting respective fluid conduits communicating with the reservoir portion 164: a high-pressure fuel outlet 176 receiving an end of the high-pressure fuel pick-up tube or take-up line 180; a high-pressure fuel return inlet 184 communicating with the high-pressure fuel return line 300; and a low-pressure fuel inlet 196 receiving an end of the low-pressure fuel line 152. The top wall 630 of the fuel vapor separator 160 includes a portion 201 defining a fuel vapor outlet 200 which communicates with a fuel vapor exhaust passage 112.

The fuel vapor separator 160 also includes means 646 operable in response to the fuel level in the reservoir portion 164 for opening and closing the fuel vapor outlet 200. While various suitable constructions can be used, in the embodiment shown in FIG. 13, such means 646 includes a float valve 648 which is normally open and which opens and closes the fuel vapor outlet 200 when the fuel level respectively falls below and rises above a predetermined level. The float valve 648 includes a needle valve member 216 which can be moved into engagement with a needle valve seat 224 located in the fuel vapor outlet 200. A float 228, which is supported by the reservoir portion 164 for pivotal movement in response to changes of the fuel level in the reservoir portion 164, is operably connected to the needle valve member 216 to move the needle valve member 216 toward the needle valve seat 224 when the fuel level in the reservoir portion 164 rises to the predetermined level. While the embodiment of the vapor separator 160 illustrated in FIG. 13 includes a conventional float valve 648, the float valve 648 can be replaced by a solenoid (not shown) for opening and closing the fuel vapor outlet 200 and a fuel level sensor (not shown) for energizing and de-energizing the solenoid in response to changes in fuel level in the reservoir portion 164.

For reasons discussed fully below, the engine 622 also includes means 649 responsive to conditions in the fuel vapor separator for controlling the high-pressure fuel pump assembly and the low-pressure fuel pump. While various suitable constructions can be successfully employed, in the illustrated embodiment, such fuel feed control means 649 includes means 650 responsive to fuel vapor pressure within the reservoir portion 164 for activating and deactivating the high-pressure fuel pump assembly 232. While various suitable constructions can be used, in the embodiment illustrated in FIG. 13, such means 650 includes a fuel vapor pressure switch 654 located in the top wall 630 of the fuel vapor separator 160 and arranged to sense the pressure of fuel vapor within the reservoir portion 164. The fuel vapor pressure switch 654 is operably connected (shown schematically in FIG. 12) to the high-pressure fuel pump assembly 232. When the fuel vapor pressure within the reservoir portion 164 is below a threshold pressure, the fuel vapor pressure switch 654 deactivates the high-pressure fuel pump assembly 232. When the fuel vapor pressure within the reservoir portion 164 is above the threshold pressure, the pressure switch 654 allows operation of or enables electrical energization of the high-pressure fuel pump assembly 232.

The fuel feed control means 649 also includes means 658 responsive to the level of fuel in the reservoir portion 164 for activating and deactivating the low-pressure fuel pump 156. While various suitable constructions can be used, in the illustrated embodiment, such means 658 includes a high fuel level or over-fill switch 662 located in the top wall 630 and operably connected (shown schematically in FIG. 12) to the low-pressure fuel pump 156 for activating and deactivating the low-pressure fuel pump 156 in response to the fuel level within the reservoir portion 164. More particularly, the over-fill switch 662 turns off the low-pressure fuel pump 156 when the reservoir portion is filled, i.e., when the fuel level within the reservoir portion 164 reaches a threshold level near the top wall 630 and above the predetermined level at which the float valve 648 closes, and turns on the low-pressure fuel pump 156 when the reservoir portion 164 is not filled.

The engine 622 also includes means 668 for pressurizing and cooling the fuel supply in the reservoir portion 164 to minimize the evaporation of fuel in the formation of fuel vapor in the reservoir portion 164 While various suitable constructions for the pressurizing and cooling means 668 can be successfully used, in the illustrated embodiment, such means 668 includes means 350 extending into the reservoir portion 164 for cooling the fuel vapor separator 160 and the fuel contained in the reservoir portion 164. In the embodiment illustrated in FIGS. 12 and 13, the fuel vapor separator cooling means 350 includes a pair of coolant manifolds 670, 674 located outwardly of the reservoir portion 164 on opposite ends of the fuel vapor separator 160; one of the manifolds 670 being a coolant inlet manifold and the other 674 of the manifolds being a coolant outlet manifold. As shown in FIG. 13, the coolant inlet and outlet manifolds 670, 674 are integrally formed with the reservoir portion 164 and located between respective pairs of inner and outer side walls 634, 638. The coolant inlet manifold 670 communicates with the above mentioned water pump (not shown) through a coolant inlet 678. Coolant exits the coolant outlet manifold 674 in a manner discussed below via a coolant outlet 682 in the outer side wall 634 of the fuel vapor separator 160 and is conducted into other cooling jackets surrounding, for example, the cylinders and exhaust passages (not shown) of the engine 622.

The vapor separator cooling means 350 also includes means 686 for conducting a flow of coolant between the coolant inlet and outlet manifolds 670, 674 and into heat-exchanging relation with the fuel supply contained by the reservoir portion 164. While various suitable constructions can be successfully employed, in the illustrated embodiment, such means 686 includes a plurality of cooling tubes 690 communicating between the inlet and outlet coolant manifolds 670, 674 across the reservoir portion 164. The cooling tubes 690 each have opposite ends communicating respectively with the coolant inlet manifold 670 and the coolant outlet manifold 674 for conducting a flow of coolant therebetween. While the cooling tubes 690 illustrated in FIG. 13 extend across the reservoir portion 164, the cooling tubes 690 can be arranged in any suitable position to conduct a coolant flow in heat-exchanging relation to fuel in the reservoir portion 164. Also preferably, the cooling tubes 690 are located relative to the reservoir portion 164 below the predetermined level at which the float valve 648 closes the fuel vapor outlet 200 thereby assuring that the cooling tubes 690 effectively cool the fuel in the reservoir portion 164.

The means 668 for pressurizing and cooling the fuel supply contained by the fuel vapor separator 160 also includes the return of fuel under pressure to the fuel vapor separator by the high-pressure fuel regulator 312 via the high-pressure fuel return line 300, the supply of fuel to the fuel vapor separator 160 by the low-pressure fuel pump 156 and the closing of the fuel vapor outlet 200 by the float valve 648. More particularly, the means 668 for pressurizing and cooling the fuel supply in the fuel vapor separator 160 includes the provision of a fuel vapor separator 160 containing a fuel supply that is pressurized by supplying fuel under pressure to the reservoir portion 164. As described below, during engine operation the reservoir portion 164 is pressurized by the return of high-pressure fuel at approximately 30 psi through the high-pressure fuel return line 300.

The engine 622 operates as follows: during engine start-up, the fuel level in the reservoir portion 164 can be below the predetermined level at which the float valve 648 closes. Under such conditions, the float 228 pivots downwardly moving the valve member 216 away from the valve seat 224, and thereby opening the fuel vapor outlet 200. Also at engine start-up, the low-pressure fuel pump 156 activates and supplies fuel to the fuel vapor separator 160 through the low-pressure fuel line 152. During this initial fill, fuel entering the reservoir portion 164 is at approximately 25 psi and can evaporate upon entering the vented reservoir portion 164. Any fuel vapor that may form in the reservoir portion 164 escapes through the open fuel vapor outlet 200 to the fuel vapor exhaust passage 112.

Also during engine start-up, the high-pressure fuel pump assembly 232 is deactivated by operation of the fuel vapor pressure switch 654. When the reservoir portion 164 of the fuel vapor separator 160 is vented, i.e. when the fuel level is low and the fuel vapor outlet 200 is open, the fuel vapor pressure in the reservoir portion 164 can be below the threshold pressure. Under such conditions within the fuel vapor separator 160, the fuel vapor pressure switch 654 deactivates the high-pressure fuel pump assembly 232. This operation allows the low-pressure fuel pump 156 to fill the reservoir portion 164 before operation of the high-pressure fuel pump assembly 232 can draw fuel from the reservoir portion 164. As a result, the level of fuel in the reservoir portion 164 rises during engine start-up.

As fuel in the reservoir portion 164 rises to the predetermined level, the float 228 also rises and moves the valve member 216 into engagement with the valve seat 224, thereby preventing passage of fuel vapor from the reservoir portion 164 through the fuel vapor outlet 200. When the fuel vapor outlet 200 is closed, a subsequent rise in fuel level increases the fuel vapor pressure within the reservoir portion 164. When the fuel vapor pressure increases to the threshold pressure, the fuel vapor pressure switch 654 activates the high-pressure fuel pump assembly 232 and fuel is drawn through the high-pressure fuel pick-up tube 180 from the reservoir portion 164.

Subsequent to engine start-up, i.e. after fuel begins to be drawn from the reservoir portion 164, and during engine operation, the high-pressure fuel pump assembly 232 supplies relatively high-pressure fuel to the fuel injectors 258. Excess fuel is returned to the fuel vapor separator 160 through the high-pressure fuel return line 300 which empties into the reservoir portion 164 through the high-pressure fuel regulator 312. Because the high-pressure fuel regulator 312 regulates the return flow of fuel at approximately 30 psi, and the fuel supplied to the vapor separator 160 by the low-pressure fuel pump is lower than 30 psi, is at approximately 25 psi, the pressure within the reservoir portion 164 is maintained at approximately 30 psi. Also, the pressure applied to the reservoir portion 164 is not allowed to dissipate through the fuel inlet tubes 152 or 300 or the fuel outlet tube 180 by virtue of the respective constructions of the low-pressure fuel pump 156, high-pressure fuel pump assembly 232, and the high-pressure fuel regulator 312.

Also during engine operation, the over-fill switch 662 activates and deactivates the low-pressure fuel pump 156 in response to the level of fuel in the reservoir portion 164. When the reservoir portion 164 is nearly filled, the low-pressure fuel pump 156 will be deactivated. Continued operation of the engine 622 draws fuel from the reservoir portion 164 through the high-pressure fuel pick-up tube 180 thereby lowering the level of fuel within the reservoir portion 164. When the level of fuel within the reservoir portion 164 drops below the threshold level detected by the over-fill switch 662, the low-pressure fuel pump 156 is activated and supplies additional fuel to the fuel vapor separator 160.

During engine operation the formation of fuel vapor within the reservoir portion 164 by evaporation is controlled by the combination of the pressure maintained within the reservoir portion 164 and by the cooling of the fuel supply contained by the fuel vapor separator 160. More particularly, with proper sizing and calibration of the low-pressure fuel pump 156, the high-pressure fuel pump assembly 232 and the high-pressure fuel flow regulator 312, fuel can be supplied to the fuel vapor separator 160 at regulated pressures. Also, with proper sizing and calibration of the coolant inlet and outlet manifolds 670, 674 and cooling tubes 690, a relatively steady fuel level can be maintained within the reservoir portion 164 without requiring the venting of fuel vapor after the initial filling of the reservoir portion 164 during engine start-up. Thus the engine 622 provides means for venting fuel vapor from the fuel vapor separator 160 during engine start-up and for preventing venting of fuel vapor from fuel vapor separator 160 during engine operation subsequent to engine start-up.

Various other features of the invention are set forth in the following claims:

We claim:

1. An internal combustion engine comprising an engine block including a combustion chamber, a fuel vapor separator, means for introducing fuel to the combustion chamber, conduit means communicating between said fuel vapor separator and said means for introducing fuel, and means for cooling said fuel vapor separator.

2. An engine as set forth in claim 1 wherein said fuel vapor separator includes a reservoir portion adapted to contain a fuel supply and wherein said means for cooling said fuel vapor separator includes means extending into said reservoir portion for conducting a flow of coolant into heat exchanging relation to the fuel supply.

3. An engine as set forth in claim 2 wherein said means for conducting a flow of coolant includes at least one conduit extending into said reservoir portion.

4. An engine as set forth in claim 3 wherein said fuel vapor separator includes a coolant manifold and wherein said at least one conduit communicates with said manifold.

5. An internal combustion engine comprising an engine block including a combustion chamber, a fuel vapor separator, means for supplying fuel to said fuel vapor separator, fuel supply means for introducing fuel to said combustion chamber from said fuel vapor separator, and means for venting fuel vapor from said fuel vapor separator during engine start-up and for preventing venting of fuel vapor from said fuel vapor separator during engine operation subsequent to engine start-up.

6. An engine as set forth in claim 5 wherein said fuel vapor separator includes a reservoir portion adapted to contain a fuel supply, and wherein said venting means includes means for maintaining said fuel supply under pressure subsequent to engine start-up.

7. An engine as set forth in claim 6 wherein said means for supplying fuel to said fuel vapor separator includes means for regulating the pressure of fuel supplied to said fuel vapor separator.

8. An engine as set forth in claim 5 wherein said means for venting includes means for maintaining a supply of fuel in the vapor separator under pressure and including means for cooling the fuel supply.

9. A fuel feed system for an internal combustion engine, said system comprising a fuel vapor separator adapted to contain a fuel supply, high-pressure fuel supply means for introducing fuel from said fuel vapor separator to the engine, low-pressure fuel supply means for supplying fuel from a fuel tank to said fuel vapor separator, and means responsive to conditions in said fuel vapor separator for controlling said high-pressure fuel supply means and said low-pressure fuel supply means.

10. A fuel feed system as set forth in claim 9 wherein said means for controlling said high-pressure fuel supply means and said low-pressure fuel supply means includes means responsive to fuel vapor pressure within said vapor separator for activating and deactivating said high-pressure fuel supply means.

11. A fuel feed system as set forth in claim 10 wherein means responsive to fuel vapor pressure within said vapor separator for activating and deactivating the high-pressure fuel supply means includes a fuel vapor pressure switch operably connected to said high-pressure fuel supply means.

12. A fuel feed system as set forth in claim 9 wherein said means for controlling said high-pressure fuel supply means and said low-pressure fuel supply means includes means responsive to the level of fuel in said vapor separator for activating and deactivating said low-pressure fuel supply means.

13. A fuel feed system as set forth in claim 12 wherein means responsive to the level of fuel in said vapor separator for activating and deactivating said low-pressure fuel supply means includes a high fuel level switch operably connected to said low-pressure fuel supply means.

14. A fuel feed system for an internal combustion engine, said system comprising an engine block including a combustion chamber, a fuel vapor separator including a reservoir portion adapted to contain a fuel supply, means for supplying fuel to said reservoir portion, fuel supply means for introducing fuel to said combustion chamber from said reservoir portion, and means for pressurizing and cooling the fuel supply in said reservoir portion.

15. A fuel feed system as set forth in claim 14 wherein said means for pressurizing and cooling the fuel supply includes means extending into said reservoir portion for conducting a flow of coolant into heat exchanging relation to the fuel supply.

16. A fuel feed system as set forth in claim 15 wherein said means for conducting a flow of coolant includes at least one conduit extending into said reservoir portion.

17. An engine as set forth in claim 16 wherein said fuel vapor separator includes a coolant manifold and wherein said at least one conduit communicates with said manifold.

18. An engine as set forth in claim 14 wherein said means for pressurizing and cooling the fuel supply includes means for regulating the pressure of fuel supplied to said fuel vapor separator.

19. An internal combustion engine comprising an engine block including a combustion chamber, fuel injector means for supplying fuel to said combustion chamber, said fuel injector means including a fuel vapor separator, an air intake manifold defining an air intake plenum housing said fuel injector means, and means for draining said plenum into said combustion chamber.

20. An internal combustion engine as set forth in claim 19 wherein said fuel injector includes at least one fuel injector housed by said compartment.

21. An internal combustion engine as set forth in claim 19 wherein said fuel injector means includes a fuel pressure regulator housed by said compartment.

22. An internal combustion engine as set forth in claim 19 wherein said fuel vapor separator includes a portion integrally formed by said air intake manifold.

23. An internal combustion engine in accordance with claim 19 wherein said means for draining said compartment into said combustion chamber includes a vertically inclined wall leading to said combustion chamber.

24. An internal combustion engine comprising an engine block including a combustion chamber, fuel injector means for supplying fuel to said combustion chamber, a fuel pump, an air intake manifold defining an air intake plenum including therein said fuel pump and said fuel injector means, and means for draining said plenum into said combustion chamber.

25. An internal combustion engine as set forth in claim 24 wherein said fuel pump is fixed to said air intake manifold.

26. An internal combustion engine as set forth in claim 24 wherein said fuel injector means includes at least one fuel injector housed by said plenum.

27. An internal combustion engine as set forth in claim 24 wherein said fuel injector means includes a fuel pressure regulator housed by said plenum.

28. An internal combustion engine in accordance with claim 24 wherein said means for draining said plenum into said combustion chamber includes a vertically inclined wall leading to said combustion chamber.

29. An internal combustion engine comprising an engine block including a combustion chamber, a fuel vapor separator, means for introducing fuel to the combustion chamber, conduit means communicating between said fuel vapor separator and said means for introducing fuel, and means for cooling said fuel vapor separator.

30. An engine as set forth in claim 29 wherein said fuel vapor separator includes a reservoir portion adapted to contain a fuel supply, and wherein said means for cooling said fuel vapor separator includes a water jacket in heat exchanging relation to said reservoir portion.

31. An engine as set forth in claim 29 wherein said engine includes means for conducting air to said combustion chamber, and wherein said means for cooling said fuel vapor separator includes location of said conducting means in heat exchanging relation with said fuel vapor separator.

32. An engine as set forth in claim 31 wherein said engine includes an air intake manifold, and wherein said fuel vapor separator is located in said air intake manifold.

33. An engine as set forth in claim 32 wherein said fuel vapor separator includes a portion which is integrally formed with said manifold.

34. An engine as set forth in claim 33 wherein said manifold defines a water jacket in heat exchanging relation with said fuel vapor separator.

35. An engine as set forth in claim 29 wherein said means for cooling said fuel vapor separator includes means for directing a flow of air into heat exchanging relation to said fuel vapor separator, and means for conducting a flow of water in heat exchanging relation to said fuel vapor separator.

36. An internal combustion engine comprising an engine block, a wall extending outwardly therefrom and defining a compartment, a fuel tank, a fuel vapor separator housed in said compartment and communicating with said tank, means for pumping fuel from said tank to said fuel vapor separator, fuel injector means adapted for supplying fuel to a combustion chamber provided in said engine block and being housed in said compartment, means for pumping fuel from said fuel vapor separator to said fuel injector means, said means for pumping fuel to said fuel injector means being housed in said compartment, and means for conducting fuel from said fuel injecting means to said fuel vapor separator.

37. An engine as set forth in claim 36 wherein said means for pumping fuel from said fuel vapor separator is mounted on said fuel vapor separator.

38. An engine as set forth in claim 36 wherein said means for pumping fuel from said fuel vapor separator is supported by said engine block.

39. An engine as set forth in claim 36 wherein said fuel vapor separator has a portion defined by said wall.

40. An internal combustion engine comprising an engine block including a combustion chamber, an intake manifold supported by said block, and fuel feed means for supplying fuel to said combustion chamber and including a fuel pump, and as fuel vapor separator communicating with said fuel pump and housed in said intake manifold.

41. An internal combustion engine as set forth in claim 40 wherein said fuel pump is housed by said intake manifold.

42. An internal combustion engine as set forth in claim 40 wherein said fuel feed means includes at least one fuel injector nozzle.

43. An internal combustion engine as set forth in claim 40 wherein said fuel feed means includes a pressure regulator.

44. An internal combustion engine as set forth in claim 40 and further comprising a cylinder head fixed to said block and supporting said air intake manifold.

45. A fuel feed system for an internal combustion engine, said fuel feed system comprising a fuel vapor separator including a reservoir portion and a cover portion releasably fixed to said reservoir portion, means for injecting fuel to the engine, pump means mounted on said cover portion of said fuel vapor separator, and conduit means communicating between said fuel vapor separator and said means for injecting fuel and including a first conduit communicating between said pump means and said fuel vapor separator, and a second conduit communicating between pump means and said means for injecting fuel.

46. A fuel feed system as set forth in claim 45 wherein said conduit means also includes a third conduit communicating between said means for injecting fuel and said fuel vapor separator.

47. An internal combustion engine comprising an engine block defining a cylinder, a crankcase, air intake means communicating with said cylinder, a water jacket between said air intake means and said crankcase, and a fuel vapor separator in heat exchanging relation to said water jacket.

48. An internal combustion engine as set forth in claim 47 wherein said water jacket is in heat exchanging relation to said air intake means.

49. An internal combustion engine as set forth in claim 47 wherein said water jacket is in heat exchanging relation to said crankcase.

50. An internal combustion engine as set forth in claim 47 wherein said fuel vapor separator includes a reservoir portion which is adapted to contain a fuel supply and which has a wall defining a portion of said water jacket.

51. An internal combustion engine as set forth in claim 47 wherein said engine block includes a second water jacket surrounding said cylinder, and wherein said first-mentioned water jacket is adapted to communicate directly with a source of coolant and conducts coolant to said second water jacket.

52. A fuel vapor separator including a housing defining a fuel reservoir, a fuel inlet communicating with said fuel reservoir, a fuel outlet communicating with said fuel reservoir, a fuel vapor outlet communicating with said reservoir, and a coolant jacket in heat exchanging relation to said housing.

53. A fuel vapor separator in accordance with claim 52 wherein said vapor separator includes a wall at least partially defining said reservoir and said cooling jacket.

54. A fuel vapor separator in accordance with claim 52 wherein said cooling jacket comprises a water jacket.

55. A fuel vapor separator in accordance with claim 54 wherein said fuel vapor separator is mounted on an internal combustion engine including an engine water jacket and wherein said fuel vapor separator water jacket communicates with said engine water jacket.

56. An air inlet manifold including wall means defining an air inlet passage, defining a cooling jacket, defining a fuel vapor separator including a fuel reservoir, and defining a wall between said fuel reservoir and said coolant jacket.

57. An air inlet manifold in accordance with claim 56 wherein said air inlet manifold is mounted on an engine including an engine water jacket and wherein said coolant jacket comprises a water jacket communicating with said engine water jacket.

* * * * *